E. K. BAKER.
SEMIWOOD WHEEL.
APPLICATION FILED APR. 27, 1918.
1,321,000.
Patented Nov. 4, 1919.
2 SHEETS—SHEET 1.
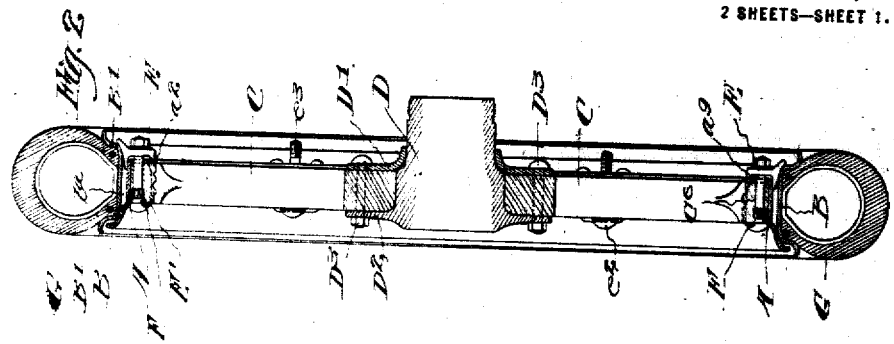
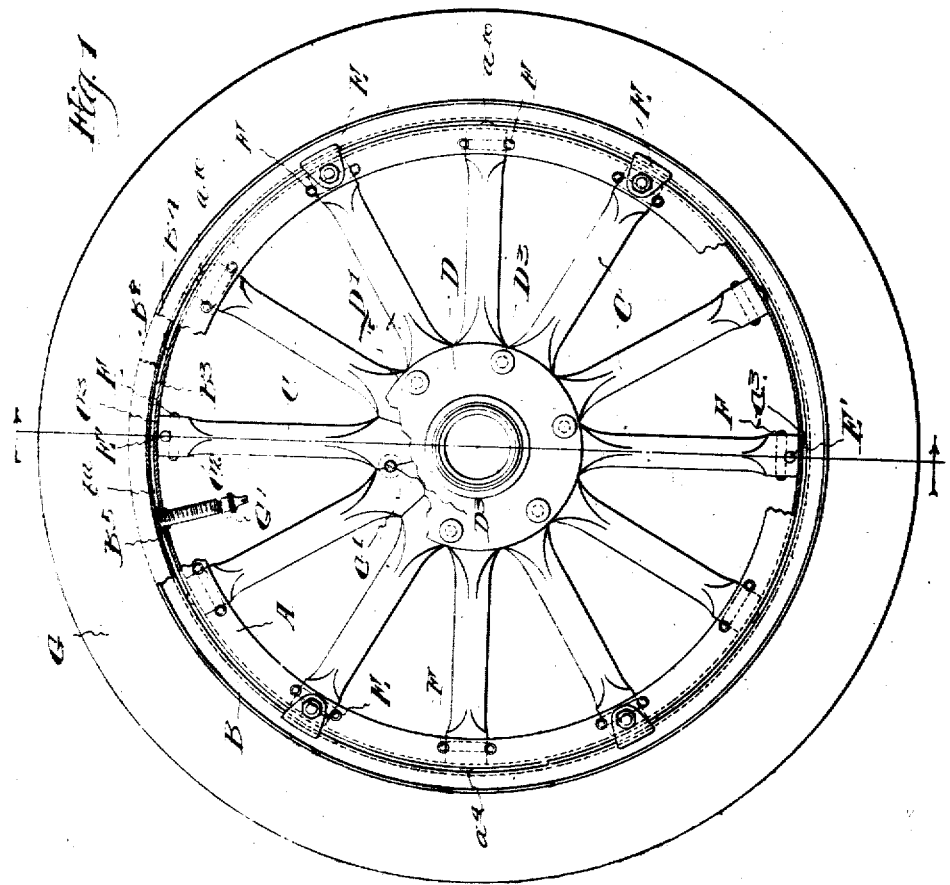

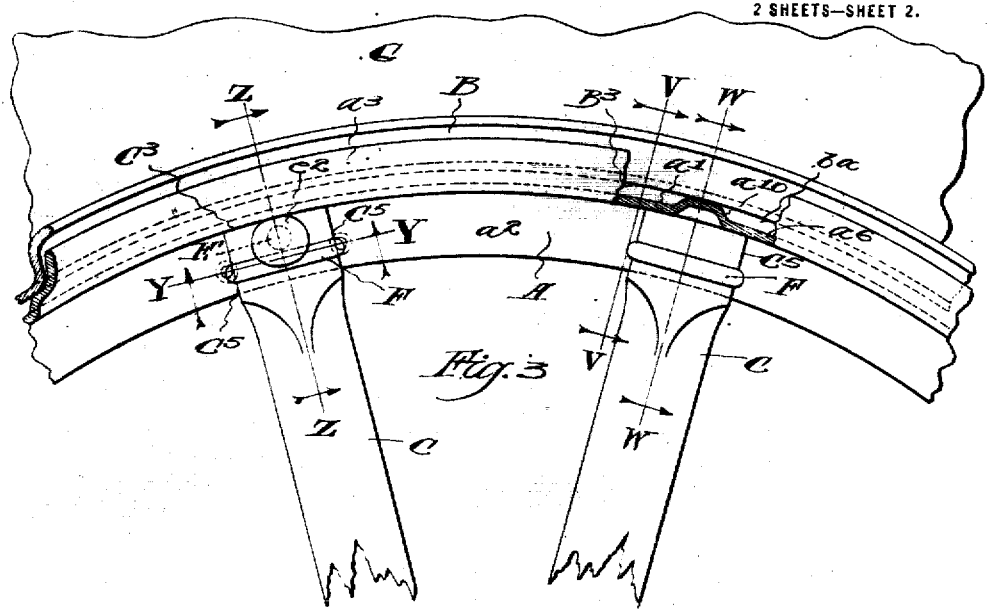
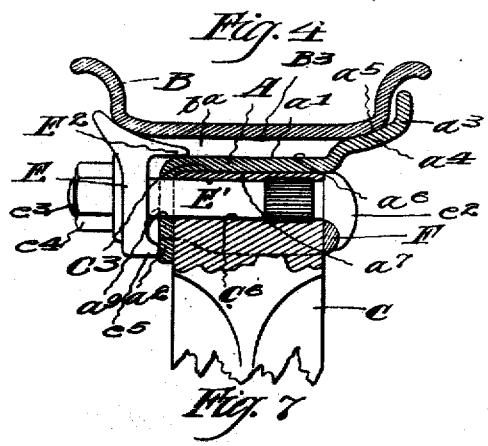
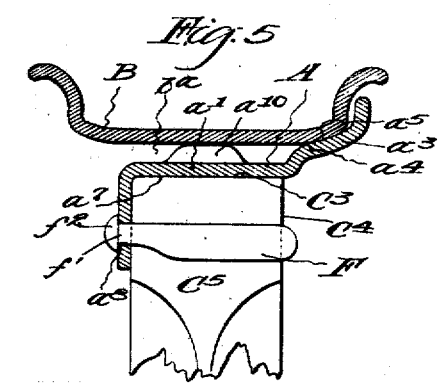
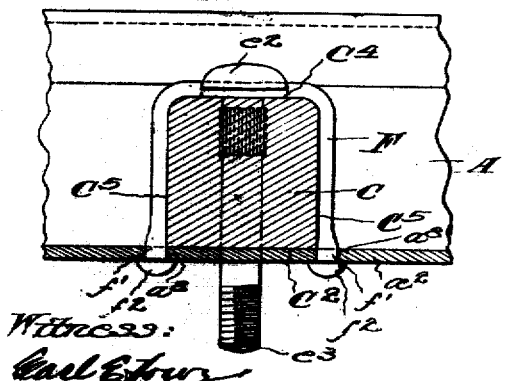
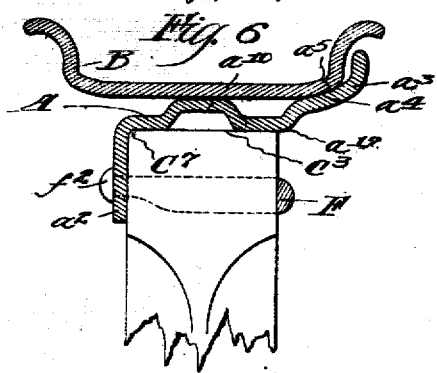

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL.

1,321,000.

Specification of Letters Patent.

Patented Nov. 4, 1919.

Application filed April 27, 1918. Serial No. 231,223.

*To all whom it may concern:*

Be it known that I, ERLE K. BAKER, a citizen of the United States, and a resident of Chicago, county of Cook, and State of Illinois, have invented a new and useful Improvements in Automobile-Wheels, Entitled Semiwood Wheels, of which the following is a specification.

My invention relates to improvements in automobile wheels of the kind equipped with demountable rims and pneumatic tires.

The object of my invention is to simplify the construction of such wheels;—to lessen the weight, and especially the peripheral weight thereof;—and, to reduce their cost, all without sacrifice of strength, durability or appearance.

I accomplish these objects chiefly through the elimination of unnecessary parts whether of wood or metal;—for, as will appear hereinafter, I dispense with the customary felly, also with the mortising and tenoning of felly and spokes, and with all felly bolts and clips; all of which I find objectionable on account of the weight which they add at the periphery of the wheel, and which represent a large part of the cost of ordinary automobile wheels.

In my invention I take advantage of a condition which is characteristically present in a pneumatic-tired automobile wheel, and which does not exist in a wheel that has a metal tire or which has a solid rubber tire. I here speak of the fact that a wheel which is encircled by an inflated pneumatic tire is therein held in a state of suspension, with the result that road shocks and blows are not directly communicated from the ground to the hub, but instead are distributed with substantial uniformity throughout the periphery of the wheel and hence to the ends of all the spokes. From this I have deduced the conclusion, borne out by experience with wire wheels, that the only real requirement of the peripheral portion and the demountable rim of an automobile wheel is that they shall be capable of holding the pneumatic tire in an inflated state and, while doing so, shall serve as a reliable connection between the base of the tire and the wooden spokes that radiate from the hub.

In conformity with this conception, I have invented an automobile wheel for demountable rims, which is fully as strong as the wheels now in use, which is of less over-all weight, which is of a minimum peripheral weight, which may be manufactured more rapidly, and at less cost than like wooden wheels of the present type;—and wherein I retain all of the well-known advantages of wooden spokes, as compared with the metal spokes which have been offered as substitutes; and incidentally, I entirely dispense with the usual heavy and expensive felly of rectangular or boxlike cross-section.

While not limited to the specific structure therein depicted, my invention will be readily understood on reference to the accompanying drawings in which: Figure 1 is a side elevation of an automobile wheel embodying my invention, portions being broken away to better disclose the construction;—Fig. 2 is a section on the line X—X of Fig. 1;—Fig. 3 is an enlarged sectional view illustrating the spoke-end fastenings and other details; Fig. 4 is a section on the line Z—Z of Fig. 3;—Fig. 5 is a section on the line V—V of Fig. 3;—Fig. 6 is a section on the line W—W of Fig. 3;—and, Fig. 7 is a further enlarged sectional detail, on the line Y—Y of Fig. 3.

As stated, my invention has to do with demountable rims and the making of wheels suitable for use therewith. Having determined that the ordinary wheel felly whether of wood or of metal is objectionable on the ground of weight and because of its initial cost and the expense of assembling it with the spokes and the metal felly band ordinarily used, I completely discard such a felly and its separate felly band or fixed rim, and substitute therefor a lighter and more efficient metal part which is in the nature of a combined felly band and felly. This part serves as the circumferential seat for the demountable rim; and serves as the part to which the spoke-ends are secured;— and, together with the spoke-ends, serves as the base upon which the rim clamping devices are secured. Preferably, I construct this combined felly band and felly, in such manner that the spokes may be assembled therewith by a straight sliding motion of the ends of the spokes with respect to this circumferential portion; whereby I am enabled to use spokes of maximum length, and therewith to expand and circumferentially tension the metal part, with a degree of accuracy and tightness never before attainable in wood wheels.

In the drawings the combined felly band and felly, to which I have referred, is marked A;—the pneumatic-tire rim with which it coacts, is marked B;—the wheel spokes are marked C;—the wheel hub is marked D, and its fixed hub flange $D^2$;—and the rim clamping devices (wedge lugs in this case) are marked E. The parts A, B, D and E are made of metal; the spokes C are made of wood. The other separate parts which enter into the structure of the wheel are the clamping bolts, $E^1$, and the U-shaped clips, F;—the loose flange, $D^1$, and the bolts, $D^3$, are counted as belonging to the hub. It remains only to mention the pneumatic tire, G, and its valve stem, $G^1$. From this brief description it will be plain that my novel wheel is of a most simple construction. The forms and functions of the individual parts, their inter-relation, and coaction may now be considered.

It is to be understood that the straight side pneumatic tire, G, and the straight-side metal rim, B, are merely representative of the several kinds of pneumatic tires and rims now in general use. At a glance, anyone skilled in the art will understand that my wheel is fully as well adapted for use with clencher rims and with clencher tires. Furthermore the rim, whatever its cross-section, may be of the endless type, with or without a detachable side flange; or the rim may be of the Baker or transplit type here shown. The straight side rim, B, herein shown, has integral tire-holding flanges, $B^1$, and is of the transplit type, as indicated at $B^2$. Practically every transplit rim in present use is characterized by an inner periphery, $B^3$, which is cylindrical, and by a rim-end connector, $B^4$, on said inner periphery; and as all such rims are of the demountable type, they are also characterized by an anti-creeper or driver, $B^6$, of some kind, which projects from said inner periphery, $B^3$, for coaction with the periphery of the wheel; in this case, with the member A. My novel wheel is made to fit all such rims, the peripheral member, A, of the wheel being formed and proportioned to permit such rims to be "buttoned" upon and "unbuttoned" from the wheel in the same manner as in the case of the metal banded wooden fellied wheels in common use.

The metal hub, D, here shown, with its spaced hub flanges, $D^1$ and $D^2$, and its hub bolts, $D^3$, represents any one of the several well known kinds of automobile wheel hubs. The wedge-shaped butts, C, of the wooden spokes constitute the central or hub-portion of the wooden portion of the wheel, and are bound or clamped rigidly between the flanges, $D^1$ and $D^2$ of the metal hub. There may be as many as desired of these wooden spokes, C, radiating from the hub, D.

The circular peripheral member, A, is usually made by first hooping up and welding the ends of a strip of flat metal stock and then rolling the endless hoop to the cross-sectional shape, best disclosed in Fig. 4. The peripheral member, A, comprises the cylindrical middle section, $a^1$, the inwardly turned or radial front flange, $a^2$, and the outwardly turned back flange, $a^3$, a portion, $a^4$, of which presents an inclined or conical circumferential seat, $a^5$, which receives the demountable rim, B. As shown, the member, A, is of substantially uniform thickness in cross-section and presents an inner periphery, $a^7$, that is circumferentially parallel to the outer periphery, $a^6$. The portion $a^1$, is of less diameter and circumference than the rim, B, so that an annular space, $ba$, is provided between the inner periphery, $B^3$, of the demountable rim and the outer periphery, $a^6$, of the member, A. The width of the annular space, $ba$, is sufficient to allow the rim, B, to be swung or "buttoned" onto the wheel in the well-known manner and is wide enough to receive the points, $E^2$, of the wedge lugs, E, which latter rest upon the member, A, and support the outer edge of the rim, B, while clamping the rim against the back flange, A. Any other form of rim-clamping lug may be used so long as it serves to drive the rim, B, axially against its seat ($a^5$) portion of the member, A.

On approaching the outer ends of the spokes, C, a new spoke formation is encountered, to-wit, the end of each spoke is substantially square in cross-section, presenting essentially, a flat outer face, $C^2$; and the extreme end of the stroke, instead of being of the usual shouldered and tenoned form, is cut straight across so that it presents a substantially flat end surface, $C^3$. The back, $C^4$, of each spoke may be flat or round, as desired; I prefer that the back shall be substantially flat, and that the sides, $C^5$, shall also be flat as shown in Fig. 7. The intermediate portions of the spokes (between the square ends and the wedge-shaped butts) may be square, round or elliptical, as chosen by the wheel-maker.

The flat or squared end, $c^3$, of each spoke engages the inner periphery, $a^7$, of the member, A, and the flat front face, $c^2$, of each spoke engages the radial or front flange portion, $a^2$, of the member, A. As will be understood from the hereinafter contained description of the method which I have devised for assembling the wheel, the ends of the spokes are in firm frictional and pressure contact with the member, A. But I do not rely upon this contact as the means of connection between the spokes, C, and the member, A, preferring instead to positively bind the parts together by suitable means which obviate the possibility of relative movement between them. Various devices may be employed to this end. By preference I metallically bind the end of each wooden spoke against the front flange, $a^2$, as by means of a U-shaped metal clip, F, which tightly fits the spoke. Each clip is placed close to the end of the spoke. The ends, $f'$, of the clip pass through holes, $a^8$, in the flange, $a^2$, and are there riveted or expanded as shown at $f^2$. By those or similar devices, all of the spoke-ends are drawn into firm engagement with the flange, $a^2$, of the member, A. Obviously, this construction serves several important ends: 1st, the spoke-ends are thereby correctly alined in a single plane that coincides with the flange, $a^2$;—2nd, the spoke-ends are accurately spaced circumferentially of the wheel;—3rd, the spokes and the member, A, are positively fixed against relative movement in an axial direction;—and, 4th, the spokes and the member, A, are so positively tied together as to prevent relative radial movement between them. In addition the backs of the metal clips serve as stops for the heads of the bolts, E', as about to be explained.

For a twelve-spoke wheel, and its demountable rim, such as shown in Fig. 1, I provide six clamping lugs, E, placing them opposite every other spoke-end. The bolts, E', belonging to these clamping lugs, pass through holes, $C^6$ (bored in the ends of the spokes), and through holes, $a^9$, in the flange, $a^2$, of the peripheral member, A. The head, $e^2$, of each bolt hooks over and bears upon the respective metal clip, F, as well shown in Figs. 3 and 4, the latter serving to prevent the head of the bolt from burying itself in the wood. The outer end, $e^3$, of each bolt has a thread and receives the nut, $e^4$, whereby the lug, E, is clamped upon the member, A, and against the demountable rim, B. It will be noted that the flange, $a^2$, provides a proper bearing for the fulcrum portion, $e^5$, of each clamping lug. In each case the clamping device (comprising the lug, E, bolt, $e'$, and nut $e^4$), when in clamped condition, adds to the security and fixity of the connection between the spoke and the member, A.

The construction best illustrated in Figs. 3 and 4 is especially admirable because it places the bolts, E', close to the middle peripheral portion of the member, A, and provides secure bearings for the bolt and the clamping lug which it carries. Special attention is directed to the fact that in each case the clamping lug, when in position, constitutes a direct support or bearing between the rim, B, and the member, A, so that the inward pressure of the rim, B, acting through the member, A, is imposed directly upon the ends of those spokes, C.

The parts, $a^{10}$, are rim-centering and supporting studs, pressed from or formed upon the portion, $a^1$, of the member, A. The height of these projections or studs is a few thousandths of an inch less than the height of the space, $ba$, between the rim, B, and of the member, A. The studs serve to center the rim, B, upon the wheel during the act of mounting the rim thereon, and thereafter serve to support the rim at points intermediate the several clamping lugs, E. One of the distinct advantages which flow from the positioning of the lugs, E, over the ends of their spokes is that it enables the centering and supporting studs, $a^{10}$, to be placed directly over the ends of the intermediate spokes, C. Therefore such road shocks as the studs, $a^{10}$, are called upon to receive, through the rim, B, are transmitted to the ends of their respective spokes. Thus the back flange, $a^4$, of the member, A, is relieved from excessive stresses that it might otherwise suffer. One who is skilled in the art will understand that the rim, B, is mounted upon and demounted from the described wheel in the ordinary manner, the driver, $b^5$, at such times, serving as the "buttoning on" pivot between the rim and wheel. The studs, $a^{10}$, insure the concentricity of the rim and wheel, both before and after the lugs, E, are clamped in place.

I do not follow ordinary methods in assembling or building the herein described wheel, but have devised a novel and extremely simple method for that purpose. As a first step, I more or less loosely assemble the group of spokes in their proper radial relations. Having thus completed radial relations, I slide the body, as a whole, axially into the encircling member, A. The circumferentially curved shoulder, $a^{12}$, of the member, A, obviously facilitates the entrance of the ends of the spokes; and the front outer corners, $C^7$, of the spokes may also be rounded, to that end. The peripheral member, A, has sufficient strength to resist material radial distortion by the spokes and hence the spokes are forced inward; with the result that the wedge-shaped or mitered ends of the spokes are set firmly together, and the member, A, is left in ideally tensioned condition. Preferably, all of the necessary holes are punched in the member, A, before the spokes are forced home and the wheel is completed by the placing of the bolts, E', and the clips, F, in the hereinbefore described positions.

From the foregoing description it will be clear that in this wheel I have attained the several objects set forth in the opening of this specification. The wheel has many advantages that may not at once be apparent but which will be appreciated by those who may make and use it. By reason of the increased length of the wooden spokes the wheel is much more resilient than the common wheel whether having a wooden or a metal felly. The member, A, is of little if any greater weight than the metal felly band of an ordinary wheel of the same size and obviously I have eliminated both the cost and the weight of the felly which has so long been considered an essential part of an automobile wheel. My novel wheel is much stronger than the ordinary wheel, and is of better appearance. It is easier to keep clean. It is little if at all affected by climatic changes for, as is well known, wooden spokes do not materially change their length when wetted and dried, and the contact of wood to wood is eliminated. Furthermore the inherent resilience imparted to the peripheral member, A, in the act of pressing the spokes into place as described, insures constant and tight contact between that member and the ends of the spokes even in the absence of the assisting bolts and clips. A further advantage which may not be recognized at first sight follows the omission of the usual felly, to-wit: the back flange, $a^3$, of my wheel, though firmly supported upon the spoke-ends, is free at points between the spokes and therefore may yield slightly to the axial thrust of the demountable rim, B. In consequence, the rim is permitted to seat itself firmly upon the back flange throughout its circumference. This is in marked contrast to the action of the ordinary wheel in which case the rim is rarely found in contact with the back flange at points directly opposite the wedge lugs.

I believe that it will be generally admitted that in this wheel I have provided the ideal complement for the now extensively used single-piece, demountable rim, such as herein illustrated.

This application is specific to certain subject-matter herein presented. The basic invention is described and claimed in my co-pending application Serial No. 328,682.

Having thus described my invention, I claim as new and desire to secure by Letters Patent—

1. The improvement in the art of making a motor vehicle wheel for use with a shock absorbing tire, that consists in making an endless metal fixed rim of a flanged cross section and of a predetermined circumference suited to a given shock absorbing tire, making wooden spokes having mitered butts and of a length approximating a radius of said rim and too great to permit the radial assembly of a full complement thereof within said rim until the mitered butts of the spokes are compressed, then assembling a full complement of said spokes with their butts in mutually coöperative relation in a single spoke plane, and then forcing said complement of spokes as a unit axially into said rim without changing the spoke plane and thereby pushing the spokes inward simultaneously and forming the spoke butts into a compressed hub center and also setting the outer ends of the spokes in strong frictional engagement with the inner periphery of said rim.

2. The improvement in the art of making a motor vehicle wheel for use with a shock absorbing tire, that consists in making an endless metal fixed rim of a flanged cross section and of a predetermined circumference suited to a given shock absorbing tire, making wooden spokes having mitered butts and a length approximating a radius of said rim and too great to permit the radial assembly of a full complement thereof within said rim until the mitered butts of the spokes are compressed, then assembling a full complement of said spokes with their butts in mutually coöperative relation in a single spoke plane, then forcing said complement of spokes as a unit axially into said rim without changing the spoke plane and thereby pushing the spokes inward simultaneously and forming the spoke butts into a compressed hub center and also setting the other ends of the spokes in strong frictional engagement with the inner periphery of said rim, and finally finishing said hub center with a hub hole that will admit a complementary wheel hub without radial disturbance of said spokes.

3. The improvement in the art of making a motor vehicle wheel for use with a shock absorbing tire, that consists in making an endless metal fixed rim of a flanged cross section and of a predetermined circumference suited to a given shock absorbing tire, making wooden spokes having mitered butts and of a length approximating a radius of said rim and too great to permit the radial assembly of a full complement thereof within said rim until the mitered butts of the spokes are compressed, then assembling a full complement of said spokes with their butts in mutually coöperative relation in a single spoke plane, then forcing said complement of spokes as a unit axially into said rim without changing the spoke plane and thereby pushing the spokes inward simultaneously and forming the spoke butts into a compressed hub center and also setting the outer ends of the spokes in strong frictional engagement with the inner periphery of said rim, thereafter positively binding the spoke ends to said metal rim, and finally finishing said hub center with a hub hole that will admit a complementary wheel hub without radial disturbance of said spokes.

4. The improvement in the art of making a motor vehicle wheel for use with a shock absorbing tire, that consists in making an endless metal fixed rim of a flanged cross section and of a predetermined circumference suited to a given shock absorbing tire, making wooden spokes having mitered butts and of a length approximating a radius of said rim and too great to permit the radial assembly of a full complement thereof within said rim until the mitered butts of the spokes are compressed, then assembling a full complement of said spokes with their butts in mutually coöperative relation in a single spoke plane, lodging said complement of spokes as a unit within said rim without changing the spoke plane and by the utilization of force applied through the rim, pushing the spokes inward simultaneously and compressing the spoke butts into a hub center portion of greater density than the other part of the spokes and also setting the outer ends of the spokes in strong frictional engagement with the inner periphery of said rim, and thereafter positively binding the outer ends of the spokes to said metal rim.

5. The new article of manufacture comprising a motor vehicle wheel for use with a shock absorbing tire and composed of a full complement of radial wood spokes having mitered butts in a single spoke plane, said spokes being pressed radially inward and their butts forming a hub center portion of a density exceeding that of the other part of the spokes, in combination with a resilient metal endless fixed rim, flanged to resist distortion and circumferentially tensioned upon the extreme outer ends of said spokes, and said hub center portion being finished with a hole of a size to admit a complementary metal hub without radial disturbance of said butts.

6. The new article of manufacture comprising a motor vehicle wheel for use with a shock absorbing tire and composed of a full complement of radial wood spokes having mitered butts in a single spoke plane, said spokes being pressed radially inward and their butts forming a hub center portion of a density exceeding that of the other part of the spokes, in combination with a resilient metal endless fixed rim, flanged to resist distortion and circumferentially tensioned upon and frictionally engaging the extreme outer ends of said spokes, means positively binding the outer ends of the spokes to said rim, and said hub center portion being finished with a hole of a size to admit a complementary metal hub without radial disturbance of said butts.

7. The new article of manufacture comprising a motor vehicle wheel for use with a shock absorbing tire and composed of a full complement of radial wood spokes having mitered butts in a single spoke plane, said spokes being pressed radially inward and their butts forming a hub center portion of a density exceeding that of the other part of the spokes, in combination with a resilient metal endless fixed rim, flanged to resist distortion and circumferentially tensioned upon and frictionally engaging the extreme outer ends of said spokes, devices individually binding said spoke ends to the flange of said rim, and said hub center portion being finished with a hole of a size to admit a complementary metal hub without radial disturbance of said butts.

8. The new article of manufacture comprising a motor vehicle wheel for use with a shock absorbing tire and composed of a full complement of radial wood spokes having mitered butts in a single spoke plane, said spokes being pressed radially inward and their butts forming a hub center portion of a density exceeding that of the other part of the spokes, in combination with a resilient metal endless fixed rim, having an inwardly projecting flange and an outwardly projecting flange and circumferentially tensioned upon and frictionally engaging the extreme outer ends of said spokes, devices individually binding said spokes to said inwardly projecting flange, and said hub center portion being finished with a hole of a size to admit a complementary metal hub without radial disturbance of said butts.

9. The new article of manufacture comprising a motor vehicle wheel for use with a shock absorbing tire and composed of a full complement of radial wood spokes having mitered butts in a single spoke plane, said spokes being pressed radially inward and their butts forming a hub center portion of a density exceeding that of the other parts of the spokes, in combination with a resilient metal endless fixed rim having an inwardly projecting flange and an outwardly projecting flange and circumferentially tensioned upon and frictionally engaging the extreme outer ends of said spokes, means binding said spokes to said inwardly projecting flange, devices positioned at the ends of some of the spokes for coaction with said outwardly projecting flange to secure a demountable rim on said fixed rim, and said hub center portion being finished with a hole of a size to admit a complementary metal hub without radial disturbance of said butts.

10. The new article of manufacture comprising a motor vehicle wheel for use with a shock absorbing tire and composed of a full complement of radial wood spokes having mitered butts in a single spoke plane, said spokes being pressed radially inward and their butts forming a hub center portion of a density exceeding that of the other part of the spokes, in combination with a resilient metal endless fixed rim having inward and outward flanges to resist distortion and circumferentially tensioned upon and frictionally engaging the extreme outer ends of said spokes, means positioned upon the outer periphery of said fixed rim directly over respective spokes and adapted to coact with said outwardly projecting flange to secure a demountable rim on said fixed rim, and said hub center portion being finished with a hole of a size to admit a complementary metal hub without radial disturbance of said butts.

11. The new article of manufacture comprising a motor vehicle wheel for use with a shock absorbing tire and composed of a full complement of radial wood spokes having mitered butts in a single spoke plane, said spokes being pressed radially inward and their butts forming a hub center portion of a density exceeding that of the other part of the spokes, in combination with a resilient metal endless fixed rim presenting a cylindrical body portion and an inwardly projecting flange, said rim being circumferentially tensioned upon said spokes with its cylindrical portion frictionally engaged with and sealing the extreme outer ends of said spokes, devices individually binding the ends of the spokes to said inwardly projecting flange of the rim, and said hub center portion being finished with a hole of a size to admit a complementary metal hub without radial disturbance of said butts.

In testimony whereof, I have hereunto set my hand this 23rd day of April, 1918.

ERLE KING BAKER.